(12) United States Patent
Miyagawa et al.

(10) Patent No.: US 7,877,991 B2
(45) Date of Patent: Feb. 1, 2011

(54) EXHAUST HEAT RECOVERY DEVICE

(75) Inventors: Masashi Miyagawa, Ichinomiya (JP); Kimio Kohara, Nagoya (JP); Seiji Inoue, Nukata-gun (JP)

(73) Assignee: Denso Corporation, Kariya (JP)

( * ) Notice: Subject to any disclaimer, the term of this patent is extended or adjusted under 35 U.S.C. 154(b) by 60 days.

(21) Appl. No.: 12/150,474

(22) Filed: Apr. 28, 2008

(65) Prior Publication Data

US 2008/0276605 A1     Nov. 13, 2008

(30) Foreign Application Priority Data

May 9, 2007    (JP)    ............... 2007-124855

(51) Int. Cl.
*F01N 3/02*  (2006.01)
*F01N 5/02*  (2006.01)
*B60H 1/00*  (2006.01)

(52) U.S. Cl. .......................... 60/320; 165/41
(58) Field of Classification Search ............ 60/320, 60/321, 616, 618, 624, 651, 671; 165/42, 165/104.21, 272, 274, 276, 279, 286, 39, 165/40, 299, 281, 41; 137/505.13
See application file for complete search history.

(56) References Cited

U.S. PATENT DOCUMENTS

| | | | | |
|---|---|---|---|---|
| 866,503 | A * | 9/1907 | Morehart | 137/505.13 |
| 2,083,611 | A * | 6/1937 | Marshall | 165/286 |
| 2,219,408 | A * | 10/1940 | Bens et al. | 137/498 |
| 3,543,839 | A * | 12/1970 | Shlosinger | 165/274 |
| 4,745,965 | A * | 5/1988 | Katsura et al. | 165/104.14 |
| 4,974,667 | A * | 12/1990 | Sun et al. | 165/41 |
| 4,982,895 | A * | 1/1991 | Shimizu et al. | 237/2 A |
| 5,509,269 | A * | 4/1996 | Kuze | 60/527 |
| 6,397,934 | B2 * | 6/2002 | Osakabe et al. | 165/104.21 |
| 6,749,173 | B2 * | 6/2004 | Heiling | 251/30.03 |
| 2007/0272307 | A1 * | 11/2007 | Patterson et al. | 137/505.13 |

FOREIGN PATENT DOCUMENTS

| | | |
|---|---|---|
| JP | 62-271922 | 11/1987 |
| JP | 04-045393 | 2/1992 |
| JP | 04045393 | * 2/1992 |

* cited by examiner

*Primary Examiner*—Thomas E Denion
*Assistant Examiner*—Christopher Jetton
(74) *Attorney, Agent, or Firm*—Harness, Dickey & Pierce, PLC

(57) ABSTRACT

An exhaust heat recovery device includes an evaporator for evaporating working medium sealed thereinto by exhaust heat from an internal combustion engine, a condenser for cooling the working medium evaporated at the evaporator, and a communication portion for communicating the evaporator with the condenser in an annular shape. The exhaust heat recovery device further includes an internal pressure operating valve adapted to be closed when a pressure of the working medium is equal to or more than a predetermined pressure, and a temperature operating valve adapted to be closed when a temperature of the coolant is equal to or more than a predetermined temperature. The internal pressure operating valve and the temperature operating valve are disposed between a downstream side of the condenser and an upstream side of the evaporator.

9 Claims, 1 Drawing Sheet

EXHAUST HEAT RECOVERY DEVICE

CROSS REFERENCE TO RELATED APPLICATION

This application is based on Japanese Patent Application No. 2007-124855 filed on May 9, 2007, the contents of which are incorporated herein by reference in its entirety.

FIELD OF THE INVENTION

The present invention relates to an exhaust heat recovery device which recovers exhaust heat of exhaust gas from an internal combustion engine so as to use the exhaust heat for heating of coolant of the engine. The exhaust heat recovery device is suitable for use in, for example, a vehicle including an internal combustion engine.

BACKGROUND OF THE INVENTION

A conventional heat exchanger is known which is disclosed in, for example, JP-A-4-45393. That is, the heat exchanger employs a loop heat pipe including a flow rate adjustment valve disposed in a midway point of a condensation duct from a condenser to an evaporator and adapted to adjust the flow rate of a heat transfer fluid flowing therein.

A branch duct is provided to be branched and connected with a midway point of an evaporation duct between the evaporator and the condenser. The branch duct is provided with a driving portion that is adapted to be operated by a vapor pressure of a predetermined value or more received from the evaporation duct. The flow rate adjustment valve has an emergency closing valve provided on a condensation side for closing the condensation duct in cooperation with the operation of the driving portion.

Thus, the degree of opening of the flow rate adjustment valve is controlled according to a temperature of fluid to which heat is transferred in the condenser, so that an amount of heat transferred to the fluid is adjusted, while the pressure in a heat pump is kept below a set value.

When the flow rate adjustment valve constantly remains opened due to any abnormal condition, the excessive evaporation continues at the evaporator. When a vapor pressure exceeds a predetermined value, the driving portion is driven to operate the emergency closing valve in cooperation with the driving portion, thereby closing the condensation duct. Thus, the flow of the heat transfer fluid is forcefully stopped, thereby preventing an abnormal increase in vapor pressure up to above the predetermined value, and also preventing the breakdown or the like of the heat pipe.

Although the heat-pipe heat exchanger prevents the increase in vapor pressure due to the excessive evaporation at the evaporator by use of the emergency closing valve, the heat exchanger cannot prevent an excessive increase in temperature of the heat-transferred fluid at the condenser.

For example, when the supply of heat from a heating source to the evaporator is abruptly stopped and at the same time the flowing of the heat-transferred fluid is stopped at the condenser, the heat-transferred fluid may have its temperature increasing excessively without closing the emergency closing valve while the evaporation effect continues due to the remaining heat from the heating source.

SUMMARY OF THE INVENTION

The invention has been made in view of the foregoing problems, and it is an object of the invention to provide an exhaust heat recovery device that can prevent an excessive increase in temperature of heat-transferred fluid on a condenser side, while preventing an excessive increase in internal pressure.

According to an example of the present invention, an exhaust heat recovery device includes: an evaporator for evaporating working medium sealed thereinto by exhaust heat from an internal combustion engine; a condenser for cooling the working medium evaporated at the evaporator, by coolant of the internal combustion engine; a communication portion for communicating the evaporator with the condenser in an annular shape; an internal pressure operating valve adapted to be closed when a pressure of the working medium is equal to or more than a predetermined pressure; and a temperature operating valve adapted to be closed when a temperature of the coolant is equal to or more than a predetermined temperature. Furthermore, the internal pressure operating valve and the temperature operating valve are disposed between a downstream side of the condenser and an upstream side of the evaporator in the communication portion.

Thus, the communication portion can be closed based on two independent conditions, including the pressure of the working medium and the temperature of coolant, so as to stop the evaporation effect at the evaporator. For example, evaporation may proceed while the internal pressure operating valve is not closed without increasing much the pressure of the working medium at the evaporator, resulting in an excessive increase in temperature of the coolant at the condenser. Even in this case, the closing of the temperature operating valve can close the communication portion to stop the evaporation effect of the evaporator, thereby preventing the excessive increase in temperature of the coolant.

For example, in a case where the predetermined temperature is higher than that of coolant obtained when the predetermined pressure is reached, an allowable maximum value is selected as the predetermined temperature. Thus, the exhaust heat can be recovered without unnecessarily closing the temperature operating valve, while preventing the excessive increase in temperature of the coolant.

The pressure control valve may be of a diaphragm type for driving a valve body by a diaphragm, for example. In this case, the diaphragm is adapted to be displaced according to the pressure of the working medium.

Furthermore, the temperature operating valve may be of a thermo-wax type for driving a valve body by a thermo-wax portion. In this case, the thermo-wax portion is formed by sealing wax thereinto which is expanded and constricted according to the temperature of the coolant.

Alternatively, the temperature operating valve may be disposed on a downstream side of the internal pressure operating valve.

Thus, in a case where a tank is provided for collecting a plurality of tubes serving as a working medium flow path in the condenser, the internal pressure operating valve is disposed in the tank. Further, the temperature operating valve can be disposed in the communication portion between the condenser and the evaporator on the downstream side of the tank, so that the exhaust heat recovery device can be easily formed.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

In an embodiment of the invention, an exhaust heat recovery device 100 is applied to a vehicle (car) using an engine 10 as a driving source for traveling. The exhaust heat recovery device 100 is disposed in an exhaust pipe 11 and an exhaust heat recovery circuit 30 of the engine 10. Now, the specific configuration of these elements will be described using FIGS. 1 and 2.

Figure 1:
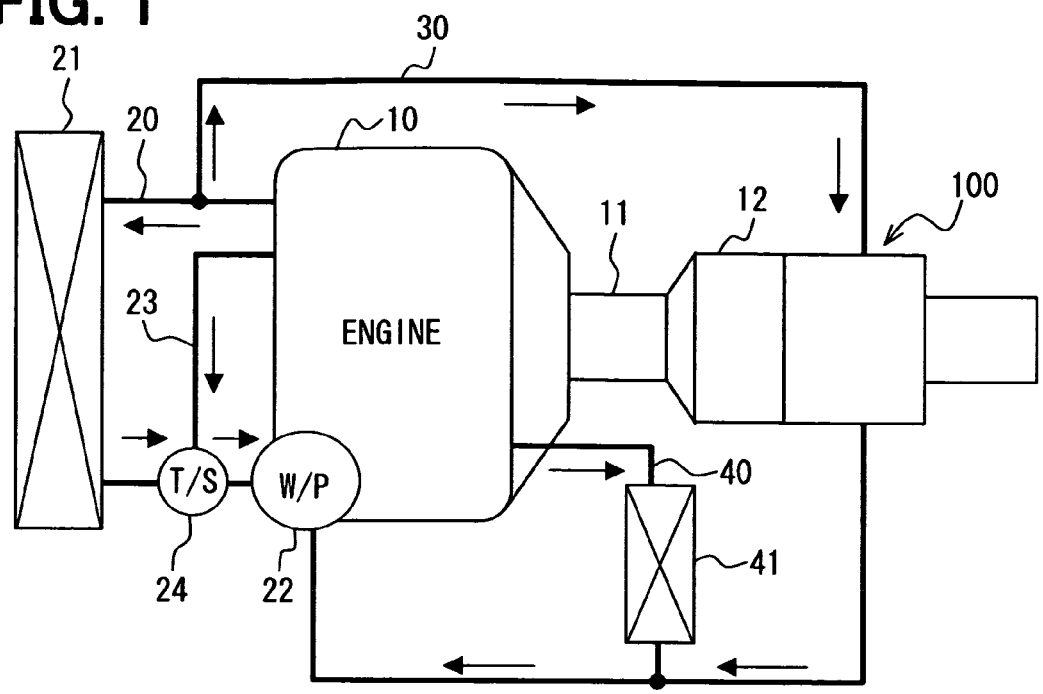
FIG. 1 is a schematic diagram showing a mounted state of an exhaust heat recovery device on a vehicle.

As shown in FIG. 1, the engine 10 is a water-cooled internal combustion engine, and includes the exhaust pipe 11 for allowing an exhaust gas to be discharged therefrom after fuel is burned. The exhaust pipe 11 is provided with a catalyst converter 12 for purifying the exhaust gas. The engine 10 includes a radiator circuit 20 for allowing engine coolant for cooling the engine 10 (hereinafter referred to as coolant) to circulate therethrough. The engine 10 also includes the exhaust heat recovery circuit 30 serving as a flow path different from the radiator circuit 20 for allowing the coolant to circulate therethrough, and a heater circuit 40 for allowing the coolant (warm water) serving as a heating source for heating conditioned air to circulate therethrough.

A radiator 21 is provided in the radiator circuit 20, and is adapted to cool the coolant circulating by a water pump 22 by heat exchange with outside air. A bypass flow path 23 for bypassing the radiator 21 to allow the coolant to pass therethrough is provided in the radiator circuit 20. A thermostat 24 adjusts an amount of coolant flowing through the radiator 21 and an amount of coolant flowing through the bypass flow path 23. In particular, in warming of the engine, the amount of coolant flowing into the bypass flow path 23 is increased to promote the warming. That is, this can prevent supercooling of the coolant by the radiator 21.

The exhaust heat recovery circuit 30 is a flow path branching from an engine outlet of the radiator circuit 20 and connected to the water pump 22. The circuit 30 is adapted to allow the coolant to circulate therethrough by the water pump 22. A water tank 140 (condenser 130) of the exhaust heat recovery device 100 to be described later is connected to the midway point of the exhaust heat recovery circuit 30.

The heater circuit 40 is a circuit for allowing the coolant (warm water) to flow from a part other than the engine outlet of the radiator circuit 20 and to be joined into the downstream side of the exhaust heat recovery circuit 30. The heater circuit 40 is provided with a heater core 41 serving as a heat exchanger for warming, and allows the coolant (warm water) to circulate therethrough by the above-mentioned water pump 22. The heater core 41 is disposed in an air conditioning case of an air conditioning unit not shown, and heats the conditioned air blown by a blower by heat exchange with the warm water.

Figure 2:
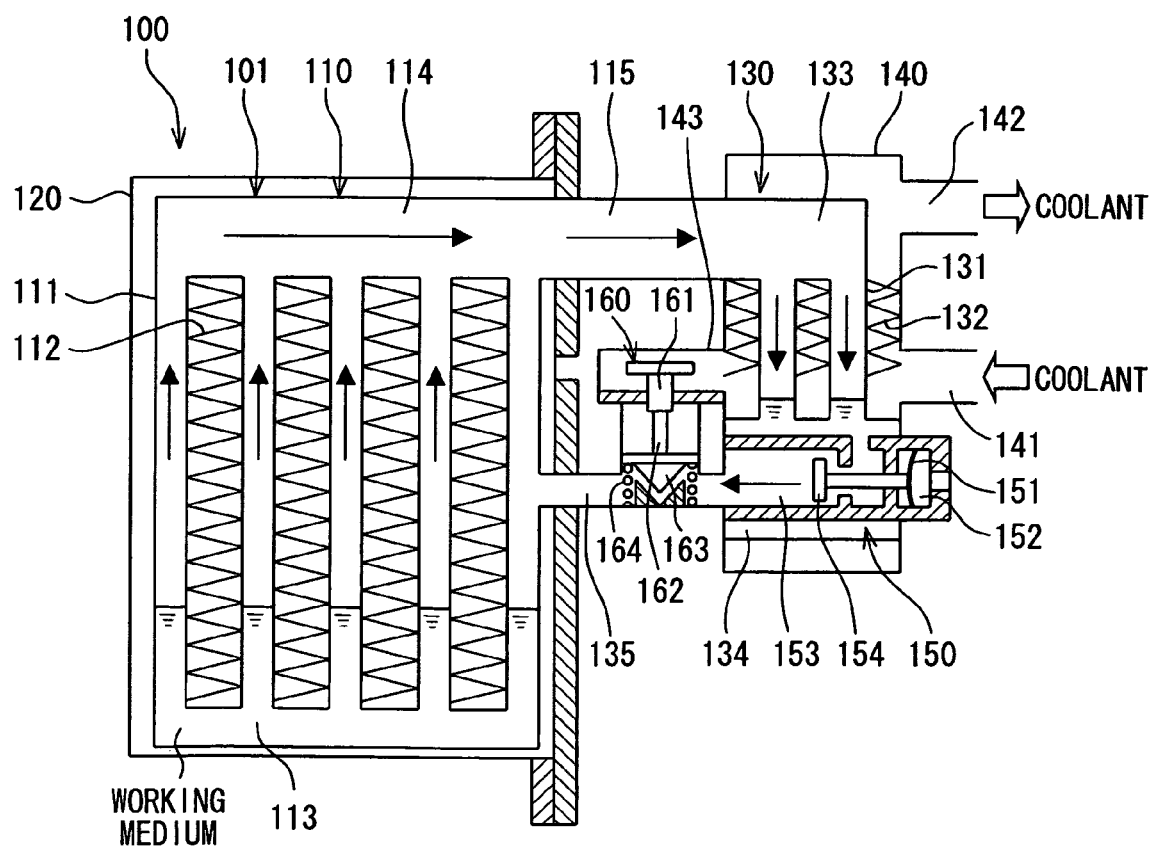
FIG. 2 is a sectional view showing the exhaust heat recovery device according to an embodiment.

As shown in FIGS. 1 and 2, the exhaust heat recovery device 100 includes an evaporator 110, a duct 120, the condenser 130, the water tank 140, an internal pressure operating valve 150, a temperature operating valve 160, and the like. In the exhaust heat recovery device 100, the evaporator 110 is accommodated in the duct 120, and the evaporator 110 and the condenser 130 are connected to each other by a connection flow path 115 and a reflux path 135 serving as a communication portion, so as to form a loop-type heat pipe 101.

The heat pipe 101 is provided with a sealing portion not shown, from which the inside of the heat pipe 101 is evacuated to vacuum (decompressed). The sealing portion is sealed after the working medium is charged thereinto. At this time, the working medium in use is water. The boiling point of water is 100° C. at 1 atmospheric pressure. Since the inside of the heat pipe 101 is decompressed (to, for example, 0.01 atmospheric pressure), the boiling point of water becomes 5 to 10° C. The working medium for use may include alcohol, fluorocarbon, flon, and the like, in addition to water.

Respective components (to be described later) constituting the exhaust heat recovery device 100 are made of stainless material having high corrosion resistance. After assembling these respective components, these components are integrally brazed together with brazing material provided in an abutment portion and a fitting portion.

The evaporator 110 is formed of tubes 111, fins 112, a lower tank 113, an upper tank 114, and the like. The tube 111 has an elongated pipe member having a flat section. These tubes 111 are arranged in line (the direction of which is hereinafter referred to as an arrangement direction) with a predetermined tube pitch formed therebetween in the left-right direction shown in FIG. 2 such that the longitudinal direction of the tubes 111 are directed vertically. Furthermore, the tubes 111 are arranged such that the above-mentioned lines are positioned in a direction orthogonal to the paper surface of FIG. 2 (hereinafter referred to as a line direction).

The fins 112 serving as a heat exchange member are located between the respective tubes 111 in the arrangement direction to be connected to the outer wall faces (surfaces) of the respective tubes 111. The fin 112 is to enlarge a heat exchange area with exhaust gas, and is, for example, a corrugated fin formed into a wave shape by roller processing using a thin band plate. The tubes 111 and the fins 112 form the heat exchanging portion of the evaporator 110.

The lower tank 113 and the upper tank portion 114 are formed to be a flat container, and are disposed on the ends of the tube 111 in the longitudinal direction. Each of the tanks 113 and 114 has tube holes (not shown) formed at positions corresponding to the tubes 111. Both ends of the tubes 111 in the longitudinal direction are connected to the tube holes of the tanks 113 and 114, and thereby the tubes 111 are in communication with the inside of the tanks 113 and 114.

The evaporator 110 is accommodated in the duct 120. The duct 120 is formed in a cylindrical shape having a rectangular section, and adapted to allow the exhaust gas to flow therethrough as described later. The evaporator 110 is accommodated such that the line direction of the tubes 111 (the direction perpendicular to the paper surface of FIG. 2) is identical to a flow direction of the exhaust gas (the direction perpendicular to the paper surface of FIG. 2).

Similarly to the evaporator 110, the condenser 130 includes a plurality of tubes 131 arranged such that the longitudinal direction of the tubes is directed vertically, and fins 132 formed in a wave shape and intervening in and connected to the tubes. Both ends of each tube 131 in the longitudinal direction are connected to the upper and lower tanks 133 and 134. The tubes 131 are in communication with the insides of the tanks 133 and 134.

The condenser 130 is accommodated in the water tank 140. The water tank 140 is a case formed in an elongated shape along the longitudinal direction of the tube 131. The water tank 140 has a coolant introduction pipe 141 for introducing the coolant thereinto on one end thereof, and a coolant discharge pipe 142 for discharging the coolant toward the outside on the other end thereof.

The internal pressure operating valve 150 is provided in the lower tank 134 of the condenser 130. The inside of the internal pressure operating valve 150 is partitioned into an atmosphere side space 152 in communication with the atmosphere, and a communication flow path 153 for communicating the lower tank 134 with the reflux path 135 to be described later via a diaphragm 151. The communication flow path 153 is connected to the diaphragm 151, and provided with a valve body 154 for opening and closing the communication flow path 153.

The diaphragm 151 is displaced in the left-right direction shown in FIG. 2 according to balance between the atmospheric pressure applied from the outside air and the internal pressure of the condenser 130 (heat pipe 101). The displacement of the valve body 154 together with the displacement of the diaphragm 151 opens and closes the communication flow path 153. In this way, the internal pressure operating valve 150 serves as a diaphragm valve for opening and closing the communication flow path 153 according to a pressure of the working medium. More specifically, when the internal pressure of the condenser 130 (heat pipe 101) increases to a predetermined pressure (valve closing pressure) or more to overcome the atmospheric pressure, the valve body 154 slides in the right direction shown in FIG. 2 to close the communication flow path 153. Conversely, when the internal pressure of the condenser 130 (heat pipe 101) is below the predetermined pressure (valve closing pressure), the valve body 154 is opened.

The internal pressure of the heat pipe 101 changes according to the balance between the amount of heat received by the evaporator 110 and the amount of heat radiated from the condenser 130 to the coolant. In general, the higher the temperature of coolant, the higher the internal pressure. The temperature of coolant in the radiator 21 is adjusted to about 90° C. in normal vehicles. Thus, when the temperature of coolant on the radiation side is supposed to be about 80 to 90° C., the predetermined pressure is determined according to the amount of heat received by the evaporator 10. When the internal pressure is below the predetermined pressure, the valve body 154 of the internal pressure operating valve 150 opens the communication flow path 153, and positively recovers the exhaust heat to the coolant as described later. Furthermore, when the internal pressure is equal to or more than the predetermined pressure, the valve body 154 is closed to stop recovering of the exhaust heat into the coolant as described later.

The condenser 130 is disposed on one side of the evaporator 110, and the upper tank 114 and the upper tank 133 are connected in communication with each other via the connection flow path 115. The connection flow path 115 penetrates the duct 120 and the water tank 140. The communication flow path 153 of the internal pressure operating valve 150 and the tubes 111 are connected in communication with each other via the reflux path 135. The reflux path 135 penetrates the duct 120 and the water tank 140. Thus, the lower tank 113, the tubes 111, the upper tank 114, the connection flow path 115, the upper tank 133, the tubes 131, the lower tank 134, the internal pressure operating valve 150 (communication flow path 153), the reflux path 135, the tubes 111, and the lower tank 113 are connected in an annular shape in that order to form the heat pipe 101.

The temperature operating valve 160 is provided at a position on the downstream side of the internal pressure operating valve 150 in the reflux path 135. The temperature operating valve 160 includes a thermo-wax portion 161, an operating stick 162, a valve body 163, and a spring 164. The thermo-wax portion 161 is formed by charging wax thereinto, which is expanded and constricted according to a temperature of the coolant. The thermo-wax portion 161 is fixed to the inside of an overhanging portion 143 that overhangs from an intermediate portion of the water tank 140 toward the evaporator 110 side. The thermo-wax portion 161 is exposed to the coolant in the water tank 140.

The operating stick 162 is a member formed in an elongated shape, and has one end inserted into the thermo-wax portion 161 and the other end extending toward the reflux path 135 on the lower side. The valve body 163 is disposed in the reflux path 135 and connected to the operating stick 162. The spring 164 is located between the valve body 163 and the lower side of the reflux path 135, and urges the valve body 163 toward the thermo-wax portion 161 side.

In general, when the temperature of coolant is below the predetermined temperature, the wax in the thermo-wax portion 161 is constricted, and an urging force of the spring 164 causes the valve body 163 to move upward as shown in FIG. 2, so that the reflux path 135 remains opened. The wax in the thermo-wax portion 161 is expanded with increasing temperature of the coolant. When the temperature of coolant is equal to or more than the predetermined-temperature, the operating stick 162 overcomes the urging force of the spring 164 to slide downward as shown in FIG. 2, so that the valve body 163 also moves downward together with the operating stick 162 to close the reflux path 135. In this way, the temperature operating valve 160 serves as a thermo-wax type valve for opening and closing the reflux path 135 according to the temperature of the coolant.

The above-mentioned predetermined temperature is set to a temperature higher than that of coolant (of about 80 to 90° C.) at a predetermined pressure (an internal pressure of refrigerant determined when the above-mentioned coolant temperature is assumed to be 80 to 90° C.) for closing the internal pressure operating valve 150. The predetermined temperature is set to 100° C. taking into consideration the upper limit of the tolerance of a coolant temperature to be controlled. For the coolant temperature of not less than the predetermined temperature, the valve body 163 of the temperature operating valve 160 closes the reflux path 135 to stop recovering the exhaust heat to the coolant as will be described later.

The exhaust heat recovery device 100 is formed in this way, and disposed in a recessed portion formed to be recessed toward the inside of a vehicle compartment as viewed from the ground under a floor of the vehicle. The duct 120 (evaporator 110) intervenes in the exhaust pipe 11 on the downstream side of a catalyst converter 12, and both pipes 141 and 142 of the water tank 140 are connected to the exhaust heat recovery circuit 30 (see FIG. 1).

Now, the operation and effects of the exhaust heat recovery device 100 with the above-mentioned arrangement will be described below.

When the engine 10 is actuated, the water pump 22 is operated to allow coolant to circulate through the radiator circuit 20, the exhaust heat recovery circuit 30, and the heater circuit 40. The exhaust gas from the fuel burned by the engine 10 flows through the exhaust pipe 11, and then purified by the catalyst converter 12. The exhaust gas flows into the evaporator 110 in the duct 120, and then discharged to the atmosphere. The coolant circulating through the exhaust heat recovery circuit 30 passes through the water tank 140 (condenser 130) of the exhaust heat recovery device 100.

After start-up of the engine 10, the temperature of coolant begins to increase, while the internal pressure of the heat pipe 101 is gradually increased. Since the amount of exhaust heat changes according to a load on the engine 10, the internal pressure of a vehicle including a normal engine changes according to various operation states of the vehicle, including acceleration, deceleration, stopping, and the like.

While the internal pressure of the heat pipe 101 is increased under the predetermined pressure, the internal pressure operating valve 150 becomes opened. The water (working medium, working medium) in the heat pipe 101 receives heat from the exhaust gas flowing in the duct 120 at the evaporator 110, and then starts to be boiled and evaporated to become steam, which rises up in the tubes 111 and flows into the condenser 130 (the upper tank 133 and the tubes 131) through the upper tank 114 and the connection flow path 115. The steam flowing into the condenser 130 is cooled by the coolant flowing in the water tank 140 from the exhaust heat recovery circuit 30 to become condensed water, which is refluxed from the tubes 111 of the evaporator 110 into the lower tank 113 after passing through the lower tank 134, the communication flow path 153 of the internal pressure operating valve 150, and the reflux path 135.

In this way, the heat of the exhaust gas is transferred to water, and then transported from the evaporator 110 to the condenser 130, where the steam is discharged as condensed latent heat in condensation, so that the coolant flowing through the exhaust heat recovery circuit 30 is positively heated. That is, warming of the engine 10 is promoted, thereby achieving reduction in friction loss of the engine 10, and reduction in an increase of fuel amount for improving startup characteristics at low temperatures, thus leading to improvement of fuel efficiency. Further, this also improves the warming property of the heater core 41 using the coolant as a heating source. Some heat of the exhaust gas is transferred to move from the evaporator 110 to the condenser 130 via an outer wall surface of the heat pipe 101.

Providing the tubes 111 and the fins 112 in the evaporator 110 can increase the area for receiving heat of the exhaust gas, thereby promoting the evaporation of the working medium at the evaporator 110, thus increasing the amount of heat transported to the condenser 130.

When the temperature of coolant is increased and the internal pressure exceeds the predetermined pressure, the internal pressure operating valve 150 is closed to interrupt the reflux of the condensed water in the heat pipe 101. Then, the water in the evaporator 110 is completely evaporated (dried out), and flows into the condenser 130, where the condensed water is stored.

That is, the heat transport performed by evaporation and condensation of water is surely stopped (which corresponds to stopping of recovery of the exhaust heat), and the amount of heat transferred to the coolant side is only heat transfer via the heat pipe 101. Thus, this switching to the stopping of recovery of the exhaust heat can prevent the disadvantage that when the recovery of exhaust heat continues while the exhaust gas temperature becomes high with increasing of a load on the engine 10, the temperature of coolant may increase excessively to exceed a radiation capacity of the radiator 21, leading to overheat.

In this state, since the temperature of the coolant in the condenser 130 is about 80 to 90° C. which does not reach the predetermined temperature, for example, 100° C., the temperature operating valve 160 remains opened. That is, the internal pressure operating valve 150 is closed so as to prevent the reflux of the condensed water in the heat pipe 101.

On the other hand, while the internal pressure of the heat pipe 101 is not increased up to the predetermined pressure and the recovery of exhaust heat is executed with the operating valve 150 opened, when the engine 10 is stopped (which is a so-called "dead soak"), the circulation of the coolant in the exhaust recovery circuit 30 is stopped by stopping of the water pump 22, so that the supply (flow) of coolant to the water tank 140 is stopped. In the evaporator 110, the evaporation effect of water continues by the remaining heat of the exhaust gas, so that the steam boiled flows into the condenser 130 to heat the coolant. Since the coolant is not supplied to the water tank 140, local boiling may occur to induce the drastic increase in temperature of the coolant for a short time.

In this embodiment, however, when the coolant temperature is equal to or more than the predetermined temperature (100° C.), the temperature operating valve 160 is brought into a closed state to close the reflux path 135, thereby preventing the reflux of the condensed water from the condenser 130 to the evaporator 110. This can stop the recovery of the exhaust heat, thereby preventing the excessive increase in temperature of the coolant.

The predetermined temperature of the coolant for closing the temperature operating valve 160 is set to a temperature higher than that of the coolant when the internal pressure reaches the predetermined pressure for closing the internal pressure operating valve 150. This can prevent the excessive increase in temperature of the coolant, while recovering the exhaust heat without frequently closing the temperature operating valve 160.

Because the temperature operating valve 160 is disposed on the downstream side of the internal pressure operating valve 150, the internal pressure operating valve 150 can be located in the lower tank 134, and the temperature operating valve 160 can be located in the reflux path 135, thereby easily forming the exhaust heat recovery device 100.

According to the above-described embodiment, an exhaust heat recovery device includes the evaporator 110 for evaporating working medium sealed thereinto by exhaust heat from an internal combustion engine, the condenser 130 for cooling the working medium evaporated at the evaporator 110 by coolant of the internal combustion engine 10, a communication portion (115, 135) for communicating the evaporator 110 with the condenser 130 in an annular shape, the internal pressure operating valve 150 adapted to be closed when a pressure of the working medium is equal to or more than a predetermined pressure; and the temperature operating valve 160 adapted to be closed when the temperature of the coolant is equal to or more than a predetermined temperature. Furthermore, the internal pressure operating valve 150 and the temperature operating valve 160 are disposed between a downstream side of the condenser 130 and an upstream side of the evaporator 110 in the communication portion (115, 135).

Thus, the communication portion 135 can be closed based on two independent conditions, including the pressure of the working medium and the temperature of coolant, so as to stop the evaporation effect at the evaporator 110. For example, evaporation may proceed while the internal pressure operating valve 150 is not closed without increasing much the pressure of the working medium at the evaporator 110, resulting in an excessive increase in temperature of the coolant at the condenser 130. Even in this case, the closing of the temperature operating valve 160 can close the communication portion 135 to stop the evaporation effect of the evaporator 110, thereby preventing the excessive increase in temperature of the coolant.

For example, the predetermined temperature may be set higher than the temperature of coolant obtained when the predetermined pressure is reached. Furthermore, the pressure control valve 150 may be of a diaphragm type for driving a valve body 154 by a diaphragm 151, for example. In this case, the diaphragm 151 is adapted to be displaced according to the pressure of the working medium. Alternatively, the temperature operating valve 160 may be of a thermo-wax type for driving a valve body 163 by a thermo-wax portion 161. In this case, the thermo-wax portion 161 is formed by sealing wax thereinto which is expanded and constricted according to the temperature of the coolant.

Furthermore, the temperature operating valve 160 may be disposed on a downstream side of the internal pressure operating valve 150. In this case, the internal pressure operating valve 150 may be disposed in the tank 134, and the temperature operating valve 160 may be disposed in the communication portion 135 disposed between the evaporator 110 and the condenser 130 at a downstream side of the tank 134. Furthermore, the communication portion 135 disposed between the downstream side of the condenser 130 and the upstream side of the evaporator 110 may be in communication with a midway point of the tube 111 in an extending direction of the tube in the evaporator 110.

In addition, the communication portion 135 disposed between the downstream side of the condenser 130 and the upstream side of the evaporator 110 may be located at a position upper than a liquid surface of the working medium sealed in the evaporator 110.

Other Embodiments

Although in each of the above-mentioned embodiments, the temperature operating valve 160 is provided on the downstream side of the internal pressure operating valve 150, the invention is not limited thereto. The temperature operating valve 160 may be provided on the upstream side of the internal pressure operating valve 150.

Although in the above description, the internal pressure operating valve 150 is of a diaphragm type and the temperature operating valve 160 is of a thermo-wax type, each of the operating valves 150 and 160 may be of any other type.

Such changes and modifications are to be understood as being within the scope of the present invention as defined by the appended claims.

What is claimed is:

1. An exhaust heat recovery device comprising:
    an evaporator evaporating working medium sealed thereinto by exhaust heat from an internal combustion engine;
    a condenser cooling the working medium evaporated at the evaporator, by coolant of the internal combustion engine;
    a communication portion communicating the evaporator with the condenser in an annular shape;
    an internal pressure operating valve being closed when a pressure of the working medium, corresponding to a first temperature of the coolant, is equal to or more than a predetermined pressure; and
    a temperature operating valve being closed when a temperature of the coolant is equal to or more than a second temperature higher than the first temperature when the pressure of the working medium is equal to or greater than the predetermined pressure,
    wherein the internal pressure operating valve and the temperature operating valve are disposed between a downstream side of the condenser and an upstream side of the evaporator in the communication portion.

2. The exhaust heat recovery device according to claim 1, wherein the pressure control valve is of a diaphragm type for driving a valve body by a diaphragm, the diaphragm being adapted to be displaced according to the pressure of the working medium.

3. The exhaust heat recovery device according to claim 1, wherein the temperature operating valve is of a thermo-wax type for driving a valve body by a thermo-wax portion, the thermo-wax portion being formed by sealing wax thereinto which is expanded and constricted according to the temperature of the coolant.

4. The exhaust heat recovery device according to claim 1, wherein the temperature operating valve is disposed on a downstream side of the internal pressure operating valve.

5. The exhaust heat recovery device according to claim 1, wherein the condenser includes a plurality of tubes for forming a working medium flow path, and a tank for collecting the working medium from the tubes,
    wherein the internal pressure operating valve is disposed in the tank, and
    wherein the temperature operating valve is disposed in the communication portion disposed between the evaporator and the condenser at a downstream side of the tank.

6. The exhaust heat recovery device according to claim 1, wherein the evaporator includes a plurality of tubes arranged in parallel for allowing the working medium to flow therethrough, and
    wherein the communication portion disposed between the downstream side of the condenser and the upstream side of the evaporator is in communication with a midway point of the tube in an extending direction of the tube in the evaporator.

7. The exhaust heat recovery device according to claim 1, wherein the communication portion disposed between the downstream side of the condenser and the upstream side of the evaporator is located at a position upper than a liquid surface of the working medium sealed in the evaporator.

8. The exhaust heat recovery device according to claim 1, wherein the internal pressure operating valve is disposed adjacent the condenser and the temperature operating valve is disposed between the internal pressure operating valve and the evaporator.

9. An exhaust heat recovery device comprising:
    an evaporator evaporating working medium sealed therein by exhaust heat from an engine;
    a condenser cooling the working medium using coolant of the engine, the condenser having an inlet receiving the working medium from the evaporator and an outlet providing the working medium to the evaporator;
    a pressure operating valve disposed between the outlet of the condenser and the evaporator, the pressure operating valve being closed when a pressure of the working medium corresponding to a first temperature of the coolant is equal to or more than a predetermined pressure; and
    a temperature operating valve disposed between the pressure operating valve and the evaporator, the temperature operating valve being closed when a temperature of the coolant is equal to or more than a second temperature higher than the first temperature when the pressure of the working medium is equal to or greater than the predetermined pressure.

* * * * *